(12) United States Patent
Kim

(10) Patent No.: US 7,816,831 B2
(45) Date of Patent: Oct. 19, 2010

(54) SPINDLE MOTOR

(75) Inventor: Se Jong Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 15 days.

(21) Appl. No.: 12/327,004

(22) Filed: Dec. 3, 2008

(65) Prior Publication Data

US 2009/0140589 A1    Jun. 4, 2009

(30) Foreign Application Priority Data

Dec. 4, 2007    (KR) ................ 10-2007-0124828

(51) Int. Cl.
*H02K 21/12* (2006.01)
(52) U.S. Cl. ................ 310/156.26; 310/67 R; 310/90
(58) Field of Classification Search ............. 310/67 R, 310/90, 156.26, 156.72, 156.75
See application file for complete search history.

(56) References Cited

U.S. PATENT DOCUMENTS

| 5,254,895 | A | * | 10/1993 | Koizumi | ............ | 310/156.06 |
| 5,552,653 | A | * | 9/1996 | Nose | ............ | 310/263 |
| 5,744,881 | A | * | 4/1998 | Ishizuka et al. | ............ | 310/67 R |
| 6,078,466 | A | * | 6/2000 | Obara | ............ | 360/99.08 |
| 6,188,155 | B1 | * | 2/2001 | Ishizuka et al. | ............ | 310/71 |
| 6,340,854 | B1 | * | 1/2002 | Jeong | ............ | 310/90 |
| 7,015,611 | B2 | * | 3/2006 | Tokunaga et al. | ............ | 310/90 |
| 7,342,333 | B2 | * | 3/2008 | Umezu | ............ | 310/67 R |

FOREIGN PATENT DOCUMENTS

| JP | 08-289523 A | 11/1996 |
| KR | 10-2007-0009914 A | 1/2007 |
| KR | 10-2007-0048338 A | 5/2007 |
| KR | 10-2007-0092004 A | 9/2007 |

* cited by examiner

*Primary Examiner*—Thanh Lam
(74) *Attorney, Agent, or Firm*—Saliwanchik, Lloyd & Saliwanchik

(57) ABSTRACT

Provided is a spindle motor. The spindle motor includes a base, a bearing housing, a bearing, a shaft, a stator, and a rotor. The bearing housing is disposed at the base. The bearing is fixed to an inside of the bearing housing. The shaft is rotatably supported by the bearing. The stator is disposed around the bearing housing. The rotor includes a rotor yoke coupled to the shaft and a magnet coupled to the rotor yoke. The rotor yoke includes a contact protrusion configured to guide a position of the magnet.

19 Claims, 2 Drawing Sheets

SPINDLE MOTOR

CROSS-REFERENCE TO RELATED APPLICATION

The present application claims the benefit under 35 U.S.C. §119 of Korean Patent Application No. 10-2007-0124828, filed Dec. 4, 2007, which is hereby incorporated by reference in its entirety.

BACKGROUND

The present disclosure relates to a spindle motor.

A spindle motor is used to rotate a disk to allow an optical pickup to read data recorded in the disk.

The spindle motor includes a rotor yoke coupled to a shaft. A disk can be rotated by loading the disk on the upper side of the rotor yoke.

BRIEF SUMMARY

Embodiments provide a spindle motor.

Embodiments also provide a spindle motor in which a turntable and a rotor yoke can be precisely coupled to desired positions of a shaft.

In one embodiment, a spindle motor includes: a base; a bearing housing installed at the base; a bearing fixed to an inside of the bearing housing; a shaft rotatably supported by the bearing; a stator around the bearing housing; and a rotor including a rotor yoke coupled to the shaft and a magnet coupled to the rotor yoke, wherein the rotor yoke includes a contact protrusion configured to guide a position of the magnet.

The details of one or more embodiments are set forth in the accompanying drawings and the description below. Other features will be apparent from the description and drawings, and from the claims.

DETAILED DESCRIPTION

A spindle motor will now be described in detail with reference to the accompanying drawings, in which exemplary embodiments are shown.

Figure 1:
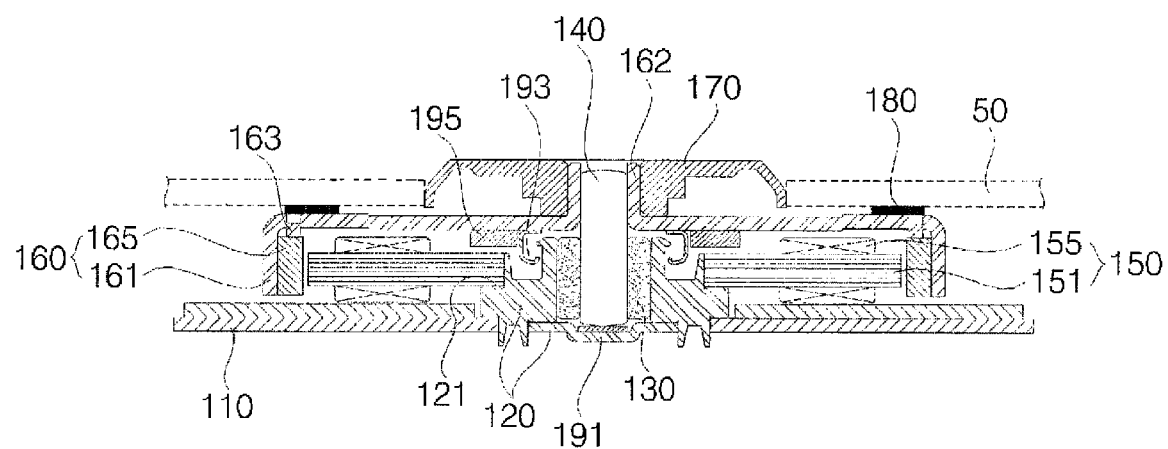
FIG. 1 is a cross-sectional view illustrating a spindle motor according to an embodiment.
Figure 2:
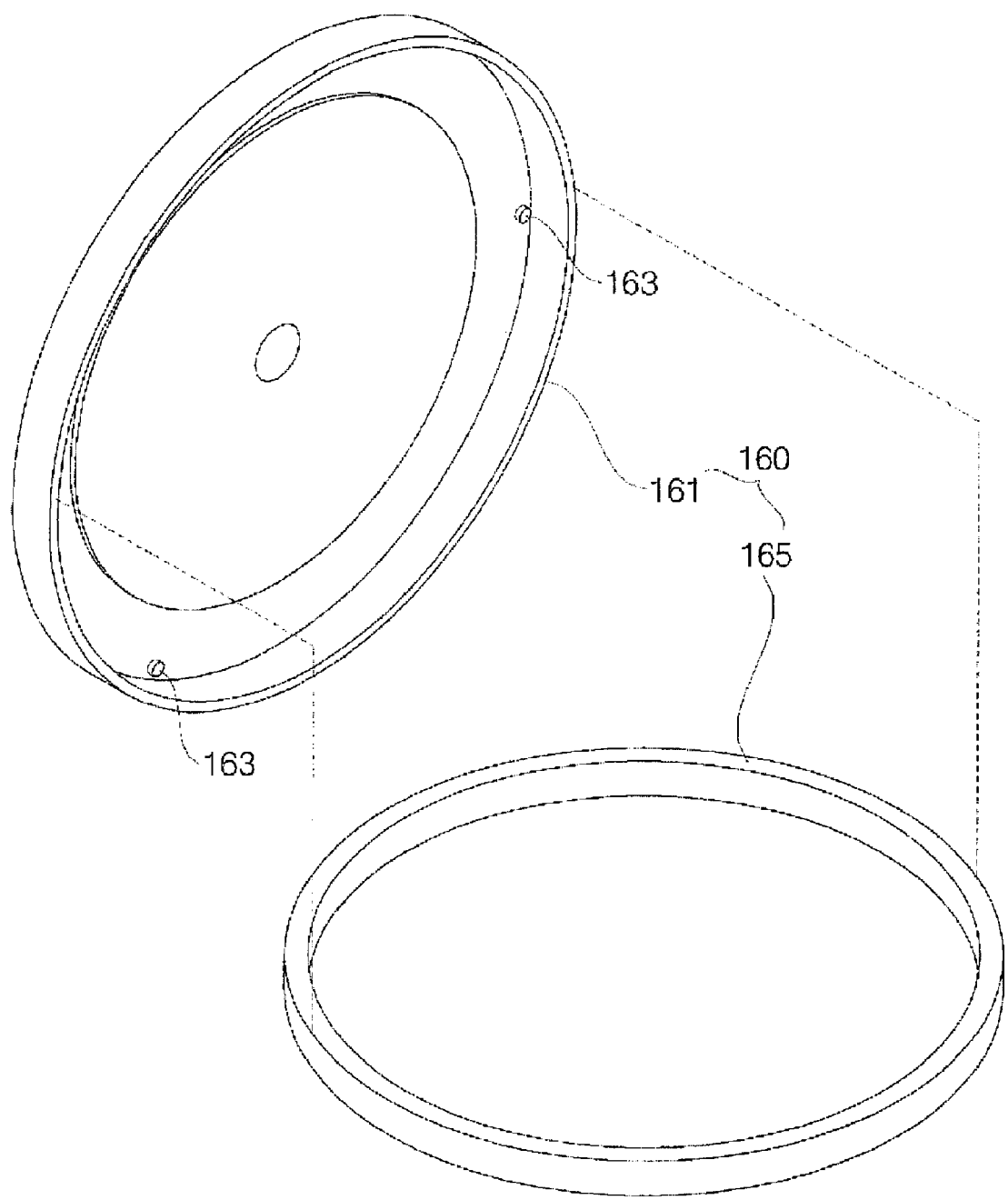
FIG. 2 is a view illustrating a rotor yoke and a magnet according to an embodiment.

FIG. 1 is a cross-sectional view illustrating a spindle motor according to an embodiment, and FIG. 2 is a view illustrating a rotor yoke and a magnet according to an embodiment.

Referring to FIGS. 1 and 2, a bearing housing 120 is vertically erected on a base 110. A bearing 130 is fixed to the inside of the bearing housing 120. A lower portion of a shaft 140 is rotatably supported by the bearing 130.

A thrust plate 191 may be disposed inside the bearing housing 120 to support a lower end of the shaft 140 for reducing noise and friction.

A stator 150 and a rotor 160 are coupled to the bearing housing 120 and the shaft 140, respectively.

The stator 150 includes a core 151 coupled to an outer surface of the bearing housing 120, and a coil 155 wound around the core 151. The stator 150 may be disposed around the bearing housing 120 and supported by the base 110.

The rotor 160 includes a rotor yoke 161 exposed to the outside of the bearing housing 120 and supported by the shaft 140, and a ring-shaped magnet 165 coupled to the rotor yoke 161 and facing the stator 150.

Therefore, when a current is applied to the coil 155, the rotor 160 and the shaft 140 are rotated by an electromagnetic force generated between the coil 155 and the magnet 165.

The rotor yoke 161 has a cylindrical shape with an opened lower side, and a disk 50 is loaded and supported on the upper side of the rotor yoke 161. A coupling tube 162 is disposed at a top center portion of the rotor yoke 161 for coupling with the shaft 140, and a clamp 170 is disposed at the coupling tube 162 for elastically supporting the disk 50 and aligning the center of the disk 50 with the center axis of the shaft 140.

A stopper 193 is coupled to the lower side of the rotor yoke 161, and a protrusion is disposed at the bearing housing 120. An upper portion of the protrusion extends outward in radial directions. Portions of the stopper 193 and the protrusion are overlapped with each other in a vertical direction. When the disk 50 is detached from the clamp 170, the shaft 140 and the rotor 160 are not detached upward owing to the stopper 193 and the protrusion.

A rubber felt 180 is fixed to a top edge portion of the rotor yoke 161. The rubber felt 180 makes contact with the disk 50. When the disk 50 rotates in contact with the rubber felt 180, slipping of the disk 50 can be inhibited owing to a large friction between the rubber felt 180 and the disk 50.

A pull-in magnet 195 may be disposed on the lower side of the rotor yoke 161 to inhibit lifting of the rotor 160 and the shaft 140.

In the above-described spindle motor of the current embodiment, the bearing housing 120 to which bearing 130 and the stator 150 are coupled is coupled to the base 110, and the rotor yoke 161 coupled with the magnet 165 is coupled to the shaft 140. The shaft 140 is inserted in the bearing 130.

A stator installation part 121 is disposed at the bearing housing 120, and the stator 150 is disposed at the stator installation part 121. Therefore, the stator 150 can be coupled to the bearing housing 120 at a predetermined height.

When the rotor yoke 161 is connected to the shaft 140, the height of the rotor yoke 161 is adjusted according to the length of the shaft 140 by using a jig, so that the rotor yoke 161 can be coupled to the shaft 140 at a predetermined position.

However, the magnet 165 may not be placed at a predetermined position of the rotor yoke 161. In this case, the centers of the stator 150 and the rotor 160 may be misaligned, and thus the centers of magnetic fields may also be misaligned.

In the spindle motor of the current embodiment, a contact protrusion 163 extends downward from the edge portion of the lower side of the rotor yoke 161. Since the contact protrusion 163 makes contact with the upper side of the magnet 165, the position of the magnet 165 can be guided.

A magnetic flux from the magnet 165 passes through the rotor yoke 161. If an end of the contact protrusion 163 is located at the inner surface of the magnet 165, an unnecessary magnetic flux may flow from the magnet 165 to the inner area of the magnet 165. In this case, the performance of the spindle motor deteriorates due to, for example, cogging. Thus, the contact protrusion 163 is disposed at an upper side of the magnet 165 between the outer and inner surfaces of the magnet 165. The contact protrusion 163 may be provided in plurality, and in this case, the plurality of contact protrusions 163 may be arranged at regular intervals.

As described above, in the spindle motor of the current embodiment, the contact protrusion 163 is disposed at the rotor yoke 161 so that the magnet 165 can be precisely coupled to the rotor yoke 161 at a predetermined position.

Therefore, the centers of the magnetic fields of the rotor 160 and the stator 150 can be precisely aligned, and thus, the spindle motor can have improved performance.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A spindle motor comprising:
   a base;
   a bearing housing installed at the base;
   a bearing fixed to an inside of the bearing housing;
   a shaft rotatably supported by the bearing;
   a stator around the bearing housing;
   a rotor comprising a rotor yoke coupled to the shaft and a magnet coupled to the rotor yoke; and
   a clamp coupled to the rotor,
   wherein the rotor yoke comprises:
      a first portion coupled to the shaft,
      a second portion extending radially outward from the first portion,
      a third portion extending downward from the second portion, wherein the magnet is coupled to the rotor yoke at an inner surface of the third portion, and
      a contact protrusion configured to guide a position of the magnet,
      wherein the contact protrusion is disposed at an upper side of the magnet between outer and inner surfaces of the magnets.

2. The spindle motor according to claim 1, wherein the contact protrusion extends downward from a lower side of the second portion of the rotor yoke.

3. The spindle motor according to claim 1, wherein the contact protrusion is provided in plurality, and the plurality of contact protrusions are spaced apart from each other.

4. The spindle motor according to claim 1, wherein the clamp elastically supports a disk.

5. The spindle motor according to claim 4, wherein the second portion of the rotor yoke includes a first region and a second region extending radially outward from the first region, wherein the first region is lower than the second region.

6. The spindle motor according to claim 5, wherein the clamp is disposed on the first region of the second portion of the rotor yoke.

7. The spindle motor according to claim 5, further comprising a rubber felt disposed on the second region of the second portion of the rotor yoke.

8. The spindle motor according to claim 7, wherein the rubber felt and the contact protrusion are overlapped with each other in a vertical direction.

9. The spindle motor according to claim 1, further comprising: a stopper coupled to a lower surface of the second portion of the rotor yoke,
   wherein the bearing housing includes a protrusion, and
      wherein portions of the stopper and the protrusion are overlapped with each other in a vertical direction.

10. The spindle motor according to claim 9, further comprising a pull-in magnet coupled to the lower surface of the second portion of the rotor yoke,
    wherein the pull-in magnet is disposed between the stopper and the contact protrusion.

11. The spindle motor according to claim 1, wherein the second portion of the rotor yoke includes a recess, and
    wherein the recess is disposed at upper side of the contact protrusion.

12. A spindle motor comprising:
    a base;
    a bearing housing installed at the base;
    a bearing fixed to an inside of the bearing housing;
    a shaft rotatably supported by the bearing;
    a stator around the bearing housing;
    a rotor comprising a rotor yoke coupled to the shaft and a magnet coupled to the rotor yoke; and
    clamp coupled to the rotor yoke,
       wherein the rotor yoke comprises:
       a first portion coupled to the shaft,
       a second portion extending radially outward from the first portion,
       a third portion extending downward from the second portion, wherein the magnet is coupled to the rotor yoke at an inner surface of the third portion, and
       a contact protrusion configured to guide a position of the magnet,
    wherein the contact protrusion is disposed at a lower side of second portion of the rotor yoke and spaced from the third portion of the rotor yoke.

13. The spindle motor according to claim 12, wherein the contact protrusion is provided in plurality, and the plurality of contact protrusions are spaced apart from each other.

14. The spindle motor according to claim 12, wherein the contact protrusion is disposed at an upper side of the magnet between outer and inner surfaces of the magnet.

15. The spindle motor according to claim 12, wherein the second portion of the rotor yoke supports a disk.

16. The spindle motor according to claim 12, wherein the second portion of the rotor yoke includes a first region and a second region extending radially outward from the first region, wherein the first region is lower than the second region.

17. The spindle motor according to claim 16, wherein the clamp is disposed on the first region of the second portion of the rotor yoke.

18. The spindle motor according to claim 16, further comprising a rubber felt disposed on the second region of the second portion of the rotor yoke.

19. The spindle motor according to claim 18, wherein the rubber felt and the contact protrusion are overlapped with each other in a vertical direction.

* * * * *